United States Patent Office 3,277,793
Patented Oct. 11, 1966

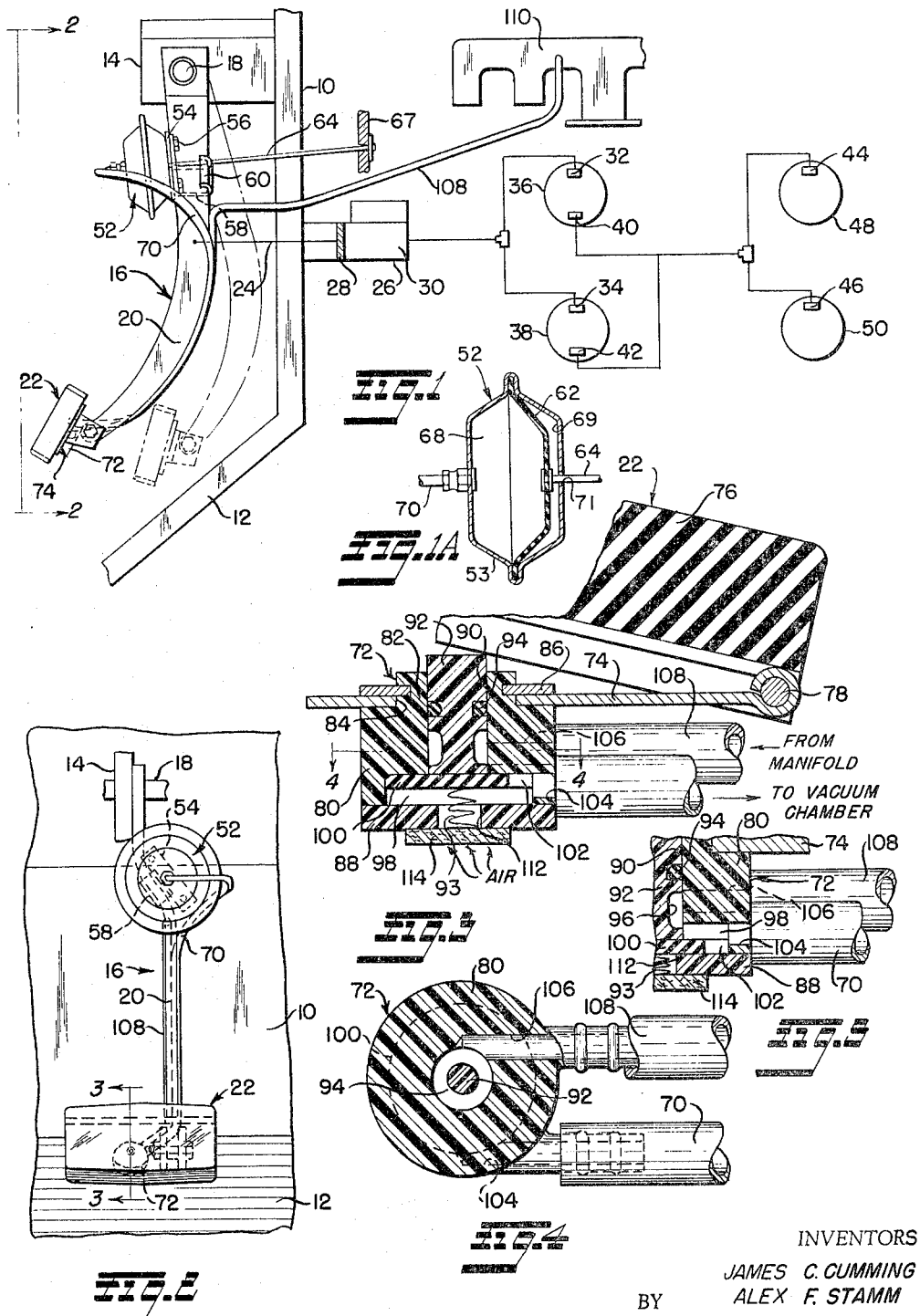

3,277,793
BRAKE OR CLUTCH PEDAL ASSIST
James C. Cumming, Pleasant Ridge, and Alex F. Stamm, Rochester, Mich., assignors, by mesne assignments, to Rockwell-Standard Corporation, a corporation of Delaware
Filed Mar. 26, 1964, Ser. No. 354,873
2 Claims. (Cl. 91—216)

The present invention relates to brake or clutch operating mechanisms for motor vehicles and more particularly to means to directly assist the operation of a foot pedal control for such mechanisms.

In motor vehicles the brakes or the clutch are usually operated by means of a foot pedal usually suspended on a pivoted lever hinged underneath the dashboard.

Due to differences in weight, physical strength and habit of the individual driver the pressure applied on the brake or clutch pedal varies widely. Also, the foot pressure applied by any individual driver during any one application varies considerably. However, a brake system in a motor vehicle, for instance, is designed on the assumption of a predetermined pedal pressure at a given leverage ratio to obtain maximum braking efficiency for best performance. The same is true in regard to a clutch mechanism.

For instance, in brake pedal operation, a considerable amount of brake pedal effort is wasted until actual deceleration begins, that is, when the pedal pressure reaches a certain designed value. It will obviously be of advantage to supplement the initial manual pressure on the brake pedal to reduce the time required to reach the design value and thus reduce the overall manual brake pedal effort. The present invention provides means to accomplish this.

Similarly, it is common knowledge that vehicles equipped with automatic transmissions tend to creep forward during a stop when the driver releases pressure on the brake pedal. Here again, an obvious advantage is gained by providing means to supplement the manual brake pedal pressure to reduce the strain on the driver which is especially pronounced during prolonged stops due to congested traffic conditions, so that only a light pressure is necessary to halt and hold the vehicle.

In clutch pedal operation on the other hand, a considerable amount of initial pedal effort is necessary to overcome the combined expansion force of the springs which normally hold the clutch engaged. This increases the effort required and delays the release of the clutch. This condition is compounded when, for instance, the brakes are applied or the clutch is released at varying speeds of the vehicle. Here too, the pressure on the brake pedal is preferably such as to achieve substantially instantaneous deceleration without excessive manual effort. The ideal condition then is a constant foot pedal pressure which is applied substantially instantaneously to realize to the fullest extent the design capacity of the vehicle braking system with reduced manual pedal effort.

In addition, it has been found highly desirable to provide some assist or augmentation of the clutch or brake pedal pressure particularly in heavy vehicles having braking systems and clutch mechanisms normally requiring considerable effort which is objectionable when the driver is fatigued.

To eliminate the above disadvantages, the present invention therefore provides power assist means which includes a motor and a valve associated with the brake or clutch pedal to assist or augment manual pressure on the pedal and to provide constant pressure thereon which becomes effective immediately upon initial depression of the pedal. The motor is preferably operated by a medium such as air, vacuum or fluid and may for this reason be conveniently connected to the manifold of a gasoline engine or to the fuel pump of a diesel engine. The valve may be positioned on the foot pedal in such manner that depression of the pedal will change the position of the valve to actuate the motor which then exerts additional pressure on the pedal.

Accordingly, a principal object of the present invention is to provide auxiliary pressure means associated with the brake or clutch pedal of a motor vehicle to assist manual pressure on the pedal and to provide a substantially instantaneously effective and constant pressure thereon.

Another object is to provide in a brake or clutch operating mechanism a means such as a vacuum or fluid motor which provides the larger part of the initial foot pedal pressure so that only a reduced amount of manual pressure is required for instantaneous brake application or clutch release.

Another object resides in the provision of a vacuum or fluid motor and an associated valve connected to the brake or clutch pedal which, when actuate by depression of the pedal, provides a substantially instant and constant force on the pedal to assist the manual pressure applied thereto.

A further object is to provide in an automotive braking system or clutch mechanism having a foot pedal for operation thereof, a motor attached to the brake or clutch pedal and comprising a diaphragm chamber which is connected to the engine manifold to be operated by the vacuum therefrom, and a valve attached to the pedal in such way that manual pressure upon the pedal causes a change in the position of the valve to thereby connect the motor to the vacuum, the motor then exerting an instantaneous and constant pressure on the pedal to assist the manual pressure thereon.

Other objects and novel features will become evident by the following detailed description in connection with the appended drawings which in:

FIGURE 1 illustrates partly schematically a vehicle braking system and the foot pedal associated therewith embodying the present invention;

FIGURE 1A is a fragmentary enlarged view, partly in section, illustrating details of the pedal assist motor;

FIGURE 2 is a plan view of the pedal and operator looking in the direction of the arrows 2—2 in FIGURE 1;

FIGURE 3 is an enlarged section substantially along line 3—3 of FIGURE 2 through the foot rest of the pedal shown in FIGURE 2 and valve attached to the foot rest;

FIGURE 4 is a transverse section along line 4—4 of FIGURE 3; and

FIGURE 5 is a section similar to FIGURE 3 showing the second position of the valve.

With reference to FIGURES 1 and 2, numeral 10 indicates the firewall of an automobile between the engine and driver compartment which continues downwardly in a slanted floor section 12 as usual. Depending from a bracket 14 which is attached to the firewall 10 is a pedal 16 pivoted at 18 to the bracket 14. Pedal 16 comprises a lever 20 which at its lower end is provided with the usual foot rest 22. The foot pedal 16 may be provided with the usual return spring (not shown) to hold the pedal in its inactivated position.

Pivotally attached to the lever 20 at a predetermined point intermediate the ends thereof is a rod 24 which extends through the firewall 10 and into the master cylinder 26 of the brake system of the vehicle where the rod is attached to a piston 28 slideable in master cylinder 26. The pressure chamber 30 of master cylinder 26 is connected to wheel cylinders 32 and 34 of a first pair of brakes 36 and 38, respectively. Brakes 36 and 38 may be wheel power brakes of a type disclosed in co-pending application Serial No. 241,265 filed November 30, 1962, now abandoned, in which the torque reaction of the brakes 36, 38 is utilized to apply the remaining wheel brakes of the vehicle. To this end, brakes 36 and 38 are provided with torque reaction power cylinders 40 and 42, respectively, connected to the wheel cylinders 44 and 46 of another pair of brakes 48 and 50, respectively.

Any other conventional brake system may be provided instead and the operating medium of the system may be compressed air, vacuum or liquid, the present embodiment as shown in FIGURE 1 being illustrative only.

In the operation of the system so far described, when the foot pedal 16 is depressed by the driver placing his foot on the foot rest 22 and exerting pressure thereon, the pedal 16 is displaced towards a position indicated in broken lines in FIGURE 1 thereby displacing the piston 28 within master cylinder 26 by the rod 24. The pressure thus created on the fluid in the pressure chamber 30 is transferred into the first pair of wheel cylinders 32 and 34 of brakes 36, 38. The torque reaction derived from these brakes creates a pressure in the torque reaction power cylinders 40 and 42 as fully described in the aforementioned co-pending application Serial No. 241,265.

As mentioned above, pressure on the foot pedal 16 varies and the initial amount of effort remains without effect during any one brake application and sometimes requires a strenuous effort on the part of the driver. For this reason it is highly desirable to have a substantially instantaneous and constant force acting on the foot pedal to obtain maximum benefit from the available braking power and at the same time assist manual operation of the foot pedal.

For this purpose the lever 20 of the foot pedal 16 is provided with a diaphragm type motor 52 positioned on the lever at its upper end near the bracket 14. Motor 52 is attached to a bracket 54 by means of screws 56. Bracket 54 has an extension 58 clamped around the lever 20 at 60 to securely attach the bracket and the motor 52 to the lever.

With further references to FIGURES 1 and 1A, motor 52 comprises a housing 53 containing a conventional diaphragm 62 which forms with the housing a vacuum chamber 68 and a vented chamber 69. The diaphragm 62 is attached a rod 64 extending outwardly of motor 52 through a vent opening 71 past lever 20 and through the firewall 10 and is securely attached behind the firewall to any convenient stationary part of the vehicle as indicated at 67. The purpose of this arrangement will become clear further on in the description. The rod 64 provides a convenient limit stop for the brake pedal 16 in the return movement to its inactivated position.

The vacuum chamber 68 of the motor 52 is connected by means of a conduit 70, which extends down the lever 20, to a valve 72 attached to the bottom plate 74 of the foot rest 22 of the pedal 16. The pad 76 of the foot rest is hinged at 78 (FIGURE 3) to the bottom plate 74 for a purpose to appear.

With reference to FIGURES 3 and 4 the valve 72 comprises a body or housing 80 which has a reduced diameter upper section 82 extending upwardly through an aperture 84 in the bottom plate 74. The housing is removably secured to the bottom plate 74 by a lock ring 86. The lower end of the housing 80 is closed by a cover plate 88.

The valve housing 80 is centrally bored as at 90 to receive a plunger 92 slideable therein. Plunger 92 is provided with an O-ring seal 94 and a recessed diameter portion 96 intermediate its ends for a purpose to appear.

The plunger aperture 90 widens at the lower end of the valve housing 80 into the chamber 98 containing a diaphragm 100 attached to the inner end of the plunger 92 by any convenient means. Diaphragm 100 has a number of recesses 102 readily spaced around its circumference for a purpose to appear.

The conduit 70 from the motor 52 is in communication with the valve chamber 98 by means of a passage 104. Another passage 106 connects the plunger bore 90 in the vicinity of the recessed portion 96 of the plunger 92 with a conduit 108 also extending along the lever 20 of the pedal 16 and which may be connected to a vacuum source such as an engine manifold indicated at 110. In other instances the conduit 108 may be connected to the fuel pump (not shown) of a diesel engine and the motor 52 may be a cylinder having a piston rather than a diaphragm for fluid communication with the fuel pump.

The lower cover plate 88 of the valve housing 80 has a central aperture 112 which is closed by a porous pad 114 of felt or similar material bonded or otherwise secured to the cover plate 88. Pad 114 allows a restricted air flow into chamber 98 but keeps out dirt and moisture.

It will be appreciated that most parts of the valve 72, which is relatively small, as for instance the housing 80, cover plate 88 and plunger 92 may be made of synthetic material. The diaphragm 100 may be made of rubber, neoprene or the like. The valve 72 thus provides a small, lightweight unit which does not add any appreciable weight to the foot pedal 16.

Normally, that is, when the pedal 16 is inactive, the position of the valve is as shown in FIGURE 3. In that position the upper end of the plunger 92 extends outwardly above the bottom plate 74 of the foot rest and is held there by means of a spring 93 in addition to an action in the system presently to be described. Pad 76 of the foot rest normally rests on the plunger 92. The weight of the pad alone will normally not be sufficient to depress the plunger downwardly. However, in some pedal structures it may be necessary to incorporate a small, relatively weak spring (not shown) between the pad 76 and the bottom plate 74 to keep the pad from depressing the plunger 92 by its own weight.

When the engine of the vehicle is running, the air suction in the manifold 110 which is connected by conduit 108 to the plunger bore 90 creates a constant vacuum around the recessed portion 96 of the plunger 92 causing air entering through pad 114 to press against the diaphragm 100 to push plunger 92 upwards with the aid of spring 93 until the diaphragm abuts against the upper surface of chamber 98 thereby closing the lower end of bore 90 and preventing communication between the manifold conduit 108 and the conduit 70 which leads into the motor 52. The combined action of pressure differential and spring force keeps the plunger in its outwardly extended position with the chamber 98 open to the atmosphere through pad 114.

When light manual pressure is applied to the pad 76 as during brake or clutch actuation the plunger 92 will be moved downwardly until the diaphragm 100 abuts against the lower surface of the chamber 98 as shown in FIGURE 5. In this position, communication between chamber 98 and plunger bore 90 and thus between conduit 108 and conduit 70 through passages 104 and 106 is established.

As the plunger 92 is depressed, the air in the chamber 98 would normally escape slowly through the aperture 112 providing an undesirable resistance to the plunger action. For this reason, the recesses or cut-outs 102 are provided on the diaphragm 100 to allow air to by-pass to the other side of the diaphragm thus providing a quick plunger action. In addition, the recesses 102 in the diaphragm 100 eliminates any undesirable hissing noise in the operation of the valve which would be caused if all air in chamber 98 were forced to escape through the aperture 112.

When communication between the conduits 108 and 70 is established the chamber 68 of the motor 52 is then directly connected to the vacuum source 110. A pressure differential is created within that chamber which tends to pull the diaphragm 62 to the left as viewed in FIGURES 1 and 1A, but, due to the connection of the diaphragm to the stationary rod 64 this pull is resisted. A force is thus exerted acting on the lever 20 due to the reaction force on the stationary diaphragm thus pivoting the lever 20 inwardly in the direction of the desired pedal movement. This additional pull on the pedal 16 greatly assist the manual pedal pressure and is as once felt by the driver of the vehicle providing a reduction in the manual effort otherwise necessary. At the same time the novel vacuum assist provides a desirable substantially instantaneous and constant pressure on the pedal instead of the varying pressure by manual application only for smooth and effective brake application or clutch release.

Immediately upon release of manual pressure on the foot rest pad 76 of the pedal 16, air will enter through aperture 112 and with the aid of spring 93, quickly push the diaphragm 100 and plunger 92 upwardly thus again preventing communication between conduits 108 and 70 and allowing air to enter chamber 68 of the motor 52 through conduit 70 eliminating the pressure differential across diaphragm 62 permitting retraction of the lever 20 in the normal manner with the assistance of the usual return springs.

In conventional brake systems the first pounds of pedal effort, for example, between 10 to 15 lbs. is used to overcome the mechanical resistance forces of the brake mechanism such as for instance the brake shoe return springs. Actual brake application would then start at about 15 lbs. of effort. The present novel pedal assist eliminates the non-effective initial range of pedal effort thereby initiating brake application and vehicle deceleration as soon as a slight pressure is exerted on the pedal.

Similar beneficial results are achived when the invention is utlized with a clutch pedal. In conventional clutch pedal mechanisms, considerable initial manual effort must be expended to overcome the inherent resistance of the clutch mechanism such as the combined forces of the clutch springs which normally keep the clutch engaged. Substantially, all of the initial manual pedal effort to overcome the resistance of the clutch mechanism is eliminated by the present novel pedal assist means. In practice the manual effort needed to overcome the resistance of the clutch springs before actual release of the clutch begins is then only about 1 lb. as against 30 lbs., in conventional clutch pedal mechanism. Thus a faster and smoother clutch releasse is obtained at less manual effort.

Thus, with the present invention a very effective and relatively simple and inexpensive pedal pressure assist has been provided which can be installed easily in any existing vehicle without major alterations.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A power assist mechanism for a clutch or brake pedal mounted in a vehicle, said pedal being swingable between inactive and active positions comprising, a motor housing mounted on said pedal, a diaphragm in said housing forming with said housing a pair of chambers, one of said chambers being open to the atmosphere, means connecting said diaphragm to fixed vehicle structure, a foot pad pivotally carried by the free end of said pedal, a valve assembly carried by the free end of said pedal beneath said foot pad to be actuated thereby, flexible conduits extending along said pedal connecting said valve to a vacuum source and to the other of said chambers in said motor, said valve being normally closed and being opened by light pressure on said foot pad to connect said other pressure chamber to said manifold to cause said motor to move in a direction to move said pedal toward its active position.

2. A power assist mechanism for vehicle clutch or brake pedal assembly, said pedal assembly comprising a lever pivotally mounted at one end on fixed vehicle structure for movement between active and inactive positions and a foot pad carried by the free end of said lever, said assist mechanism comprising a motor housing mounted on said lever adjacent said one end of said lever, a diaphragm in said housing and forming with said housing a pair of chambers, one of said chambers being open to the atmosphere, a rod extending through said motor housing into said one chamber and connecting said diaphragm to fixed vehicle structure, a valve assembly carried by the free end of said lever beneath said foot pad to be actuated thereby, conduits extending along said lever connecting said valve to a vacuum source and to the other of said chambers in said motor, said valve being normally closed and being opened by light pressure on said foot pad to connect said other pressure chamber to said vacuum source to cause said motor housing to move in a direction to move said pedal towards its active position.

References Cited by the Examiner

UNITED STATES PATENTS

| 2,445,862 | 7/1948 | Price | 91—378 |
| 2,731,797 | 1/1956 | Ayers | 91—378 |
| 2,808,704 | 10/1957 | Hill et al. | 91—378 |
| 2,808,705 | 10/1957 | Ingres | 91—378 |
| 2,905,152 | 9/1959 | Ingres | 91—378 |

MARTIN P. SCHWADRON, *Primary Examiner.*

SAMUEL LEVINE, *Examiner.*

P. E. MASLOUSKY, *Assistant Examiner.*